United States Patent [19]

Occelli

[11] Patent Number: 5,035,868
[45] Date of Patent: Jul. 30, 1991

[54] CATALYST COMPOSITION CONTAINING A CRYSTALLINE GALLIOSILICATE HAVING THE ZEOLITE L TYPE STRUCTURE

[75] Inventor: Mario L. Occelli, Yorba Linda, Calif.

[73] Assignee: Union Oil Company of California, Los Angeles, Calif.

[21] Appl. No.: 458,351

[22] Filed: Dec. 28, 1989

Related U.S. Application Data

[60] Division of Ser. No. 274,621, Nov. 22, 1988, Pat. No. 4,919,907, which is a continuation-in-part of Ser. No. 945,092, Dec. 22, 1986, abandoned.

[51] Int. Cl.$^5$ .............................................. C01B 33/28
[52] U.S. Cl. .................................... 423/326; 423/328; 423/332; 502/61; 502/77
[58] Field of Search ................... 423/326, 328; 502/61, 502/77

[56] References Cited

U.S. PATENT DOCUMENTS

| | | |
|---|---|---|
| 3,431,219 | 3/1969 | Argauer . |
| 4,331,774 | 5/1982 | Boersma et al. . |
| 4,495,303 | 1/1985 | Kuehl . |
| 4,554,146 | 11/1985 | Vaughan . |
| 4,585,641 | 4/1986 | Barri et al. . |
| 4,657,749 | 4/1987 | Vaughan . |
| 4,701,315 | 10/1987 | Wortel . |
| 4,803,060 | 2/1989 | Occelli . |
| 4,919,907 | 4/1990 | Occelli ............................... 423/326 |

FOREIGN PATENT DOCUMENTS

| | | |
|---|---|---|
| 1182096 | 2/1985 | Canada . |
| 0107875 | 5/1984 | European Pat. Off. . |
| 0130013 | 1/1985 | European Pat. Off. . |
| 0134058 | 3/1985 | European Pat. Off. . |
| 190818 | 11/1983 | Japan . |

OTHER PUBLICATIONS

J. Selbin and R. B. Mason, "Preparation of Gallium-Containing Molecular Sieves," *J. Inorg. Nucl. Chem.*, vol. 20, 1961, pp. 222-228.

K. Suzuki, Y. Kiyozumi, S. Shin and S. Ueda, "Synthesis of New Gallosilicate Zeolite with Sodalite Structure," *Zeolites*, vol. 5, 1985, pp. 11-14.

S. Hayashi, K. Zuzuki, S. Shin, K. Hayamizu and O. Yamamoto, "High Resolution $^{29}$Si Nuclear Magnetic Resonance Study on Gallosilicates with Zeolitic Structures," *Bull. Chem. Soc. Jpn.*, vol. 58, 1985, pp. 52-57.

J. M. Newsam, D. E. W. Vaughan, "Structural Studies of Gallosilicate Zeolites," *New Developments in Zeolite Science and Technology, Proceedings of the 7th International Zeolite Conference, Tokyo, 1986, pp. 457-464*.

P. A. Wright, J. M. Thomas, A. K. Cheetham, A. K. Nowak, "Localizing Active Sites in Zeolitic Catalysts": Neutron Powder Profile Analysis and Computer Simulation of Deuteropyridine Bound to Gallozeolite-L, *Nature*, vol. 318, Dec. 1985, pp. 611-614.

Selbin (et al.) J. Inorg. Nucl. Chem. 1961, vol. 20 pp. 222-228.

Murakami (et al.) New Developments in Zeolite Science & Technology, 1986 (Elseirer) pp. 457-464.

*Primary Examiner*—Asok Pal
*Attorney, Agent, or Firm*—Yale S. Finkle; Gregory F. Wirzbicki

[57] ABSTRACT

A crystalline, galliosilicate molecular sieve having the zeolite L type structure and the following composition expressed in terms of oxide mole ratios in the anhydrous state:

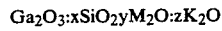

$$Ga_2O_3 : xSiO_2 : yM_2O : zK_2O$$

where M is an alkali metal other than potassium, preferably sodium, x equals at least 3.0, preferably 4 to 10, y equals 0 to 0.9 z equals 0.1 to 1.0, and y+z equals about 1.0. The crystalline, galliosilicate molecular sieve of the invention may be employed, after reducing its alkali metal content, as a component of a catalyst which can be used in a variety of chemical conversion processes, preferably hydrocarbon conversion processes, and most preferably hydrocracking and isomerization processes.

21 Claims, 2 Drawing Sheets

CATALYST COMPOSITION CONTAINING A CRYSTALLINE GALLIOSILICATE HAVING THE ZEOLITE L TYPE STRUCTURE

CROSS REFERENCES TO RELATED APPLICATIONS

This patent application is a division of Ser. No. 274,621 filed in the United States Patent and Trademark Office on Nov. 22, 1988, now U.S. Pat. No. 4,919,907, which is a continuation-in-part of U.S. patent application Ser. No. 945,092, filed in the United States Patent and Trademark Office on Dec. 22, 1986, now abandoned.

BACKGROUND OF THE INVENTION

This invention relates to crystalline galliosilicates and is particularly concerned with a crystalline galliosilicate molecular sieve having the zeolite L type structure, methods of producing such a molecular sieve, catalysts containing such a molecular sieve and processes for using catalysts containing such a molecular sieve.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimensions while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

The pore size of a zeolite can vary from about 2.6 Angstroms for analcime to about 10.0 Angstroms for zeolite omega. The term "pore size" as used herein refers to the diameter of the largest molecule that can be sorbed by the particular zeolite or other molecular sieve in question. The measurement of such diameters and pore sizes is discussed more fully in Chapter 8 of the book entitled "Zeolite Molecular Sieves," written by D. W. Breck and published by John Wiley & Sons in 1974, the disclosure of which book is hereby incorporated by reference in its entirety. The pore size range of 2.6 to 10.0 Angstroms is particularly suited for molecular separation and catalytic processing. Analcime will sorb ammonia while excluding larger molecules whereas zeolite omega will sorb perfluorotributyl amine $[(C_4F_9)_3N]$ while excluding any molecule having a diameter greater than about 10.0 Angstroms. All of the other approximately 150 zeolites now known have pore sizes falling within the range between 2.6 and 10.0 Angstroms.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolitic" as used herein refers to molecular sieves whose frameworks are formed of substantially only silica and alumina tetrahedra. One such class of new molecular sieves that has been created is that in which all the framework aluminum has been replaced by gallium. Specifically, it has been reported in the literature that galliosilicate molecular sieves having the faujasite structure, the pentasil structure and the mordenite structure have been synthesized. The synthesis of a galliosilicate analogue of Theta-1 zeolite has also been reported. There has, however, been no reported instance of a sodium-potassium galliosilicate with the zeolite L type structure and containing substantially no aluminum having been synthesized.

Accordingly, it is one of the objects of the present invention to provide a crystalline, galliosilicate molecular sieve with the zeolite L type structure, and a method for preparing such a molecular sieve, which sieve may be useful in many types of chemical conversion processes, particularly hydrocarbon conversion processes. This and other objects of the invention will become more apparent in view of the following description of the invention.

SUMMARY OF THE INVENTION

In accordance with the invention it has now been found that a crystalline, galliosilicate molecular sieve comprising silicon, gallium and oxygen and having the zeolite L type crystal structure can be synthesized by mixing, preferably in the absence of an organic templating agent, a source of gallia, a source of silica, a source of potassium, water and, optionally, a source of an alkali metal other than potassium, to form a hydrogel having the following composition expressed in terms of oxide mole ratios:

$SiO_2/Ga_2O_3 = 10$ to $35$ $(M_2O + K_2O)/Ga_2O_3 = 1$ to $15$ $H_2O/Ga_2O_3 = 80$ to $1000$ $M_2O/K_2O = 0$ to $100$ where M is an alkali metal other than potassium, preferably sodium. After the above-described hydrogel is formed, it is crystallized to form the synthetic, crystalline, galliosilicate molecular sieve of the invention. This molecular sieve typically has the composition, expressed in terms of oxide mole ratios in the anhydrous state, of $$Ga_2O_3 : xSiO_2 : yM_2O : zK_2O$$

where x equals at least 3.0, y equals 0 to 0.9, z equals 0.1 to 1.0, and z+y equals about 1.0. The X-ray powder diffraction pattern of the molecular sieve contains at least the d-spacings set forth in Table 1 below, which d-spacings are characteristic of a zeolite with the L type structure.

TABLE 1

| Interplanar d-spacings (Angstroms) | Relative Intensity (100 × $I/I_o$) |
|---|---|
| 16.00 ± 0.50 | 80–100 |
| 8.00 ± 0.50 | 5–40 |
| 7.50 ± 0.20 | 10–50 |
| 6.00 ± 0.20 | 15–50 |
| 5.80 ± 0.15 | 5–25 |
| 4.60 ± 0.15 | 20–70 |
| 3.90 ± 0.15 | 20–70 |
| 3.60 ± 0.15 | 10–50 |
| 3.49 ± 0.15 | 15–70 |
| 2.92 ± 0.10 | 10–70 |

DETAILED DESCRIPTION OF THE INVENTION

The crystalline, galliosilicate molecular sieve of the invention is prepared by crystallizing a hydrogel formed by mixing a source of gallia, a source of silica, a source of potassium and, optionally, a source of an alkali metal other than potassium with water under conditions such that the various components react to form the desired hydrogel. The crystallization is preferably carried out in the absence of an organic templating agent. Since a source of aluminum is not used in forming the hydrogel, the only aluminum present in the crystallized galliosilicate will be aluminum impurities in the source materials. Thus, the galliosilicate molecular sieve of the invention will normally contain less than about 0.2 weight percent alumina and less than about 0.2 weight percent aluminum, preferably less than about 0.1 weight percent of each, more preferably less than about 0.05 weight percent of each, and will usually be substantially free of both alumina and aluminum.

The silica used in forming the hydrogel may be in the form of sodium silicate, silica hydrosols, silica gels, silica salts and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal dispersions of silica particles.

The source of potassium used in forming the hydrogel may be a potassium salt or potassium hydroxide. When it is desired to use an alkali metal in addition to potassium, preferably sodium, the source of the alkali metal is typically the corresponding alkali metal salt or hydroxide. It is possible for the source of the potassium and any other alkali metal utilized to also be the source of gallia utilized to form the hydrogel. Alkali metal gallates are examples of materials which serve as a source of both an alkali metal and gallia.

The gallia used to produce the hydrogel from which the galliosilicate molecular sieve of the invention is crystallized may be in the form of gallium oxide, gallium hydroxide, an alkali metal gallate or an inorganic gallium salt, such as gallium nitrate, gallium sulfate, and gallium acetate. As mentioned above, the source of the gallia may also be the source of the potassium and any other alkali metal used to form the hydrogel. In fact, a preferred source of gallia is prepared by dissolving gallium oxide in an aqueous solution of potassium hydroxide to form potassium gallate or in an aqueous solution of sodium and potassium hydroxide to form a mixture of sodium and potassium gallate.

The hydrogel from which the galliosilicate molecular sieve of the invention is crystallized is normally prepared by first dissolving the source of gallia in an aqueous solution of potassium hydroxide or, if another alkali metal in addition to potassium is used, in an aqueous solution containing a mixture of potassium hydroxide and the other alkali metal hydroxide. The resulting solution is then mixed with a source of silica to form the gel which is then vigorously stirred. A sufficient amount of the gallia source, the silica source, the potassium source, water and, optionally, the source of alkali metal other than potassium is used so that the resultant hydrogel has the following composition expressed in oxide mole ratios:

$SiO_2/Ga_2O_3 = 10$ to 35, preferably 16 to 30
$(M_2O + K_2O)/Ga_2O_3 = 1$ to 15, preferably 5 to 10
$H_2O/Ga_2O_3 = 80$ to 1000, preferably 100 to 300
$M_2O/K_2O = 0$ to 100, preferably 0 to 10 where M is an alkali metal other than potassium. When an alkali metal other than potassium is used in forming the hydrogel, the mole ratio of $M_2O$-to-$K_2O$ will preferably range from about 0.5 to 5.0.

After all of the components of the hydrogel have been combined together, the hydrogel is vigorously stirred at atmospheric pressure and at a temperature between about 20° C. and about 150° C., preferably at about room temperature, for from about 1 hour to about 2 days, preferably between about 1 hour and about 10 hours. After stirring, the hydrogel is crystallized by heating, with or without stirring, for between about 2 days and 10 days at temperatures in the range between about 70° C. and 250° C., preferably between about 90° C. and 175° C. The temperature is normally controlled within the above ranges to avoid the formation of phase impurities. After the hydrogel has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water. Since an organic templating agent is normally not used in forming the hydrogel which is crystallized, these dried crystals will typically contain no traces of an organic templating agent such as tetraalkylammonium cations.

The dried crystals produced as described above comprise the molecular sieve of the invention and will normally have the following composition expressed in terms of oxide mole ratios in the anhydrous state:

$$Ga_2O_3:xSiO_2:yM_2O:zK_2O$$

where M is an alkali metal other than potassium, x equals at least 3.0, preferably 4 to 10, y equals 0 to 0.9, z equals 0.1 to 1.0, and the sum of y and z equals approximately 1.0. The X-ray powder diffraction pattern of the crystallized molecular sieve of the invention will typically contain at least the d-spacings set forth in Table 1, preferably the d-spacings set forth in Table 2 below. When an alkali metal other than potassium is present, y will preferably be between 0.1 and 0.7 and z will range between 0.3 and 0.9.

TABLE 2

| Bragg Angle 2-Theta (Degrees) | Interplanar d-spacings (Angstroms) | Relative Intensity (100 × I/I$_o$) |
| --- | --- | --- |
| 5.3–5.6 | 16.67–15.77 | 80–100 |
| 10.9–11.1 | 8.11–8.04 | 3–30 |
| 11.5–11.8 | 7.69–7.49 | 15–50 |
| 14.5–14.7 | 6.10–6.02 | 25–75 |
| 15.0–15.2 | 5.90–5.82 | 5–30 |
| 19.0–19.3 | 4.67–4.60 | 50–80 |
| 19.8–20.1 | 4.48–4.41 | 5–25 |
| 20.2–20.4 | 4.39–4.35 | 3–15 |
| 22.3–22.6 | 3.98–3.93 | 20–80 |
| 23.1–23.6 | 3.85–3.77 | 3–15 |
| 24.0–24.3 | 3.70–3.66 | 20–60 |
| 25.3–25.6 | 3.52–3.48 | 30–70 |
| 25.9–26.2 | 3.44–3.40 | 3–15 |
| 26.7–27.1 | 3.34–3.29 | 15–50 |
| 27.6–28.0 | 3.23–3.18 | 30–80 |
| 28.8–29.1 | 3.10–3.07 | 30–80 |
| 30.3–30.7 | 2.95–2.91 | 30–80 |
| 31.6–32.0 | 2.83–2.79 | 3–15 |
| 33.3–33.7 | 2.69–2.66 | 15–50 |
| 33.8–34.2 | 2.65–2.62 | 5–30 |
| 34.8–35.1 | 2.58–2.55 | 3–15 |
| 35.4–35.8 | 2.53–2.51 | 5–30 |
| 35.8–36.3 | 2.51–2.47 | 3–15 |
| 36.6–36.9 | 2.45–2.43 | 5–20 |

Figure 1:
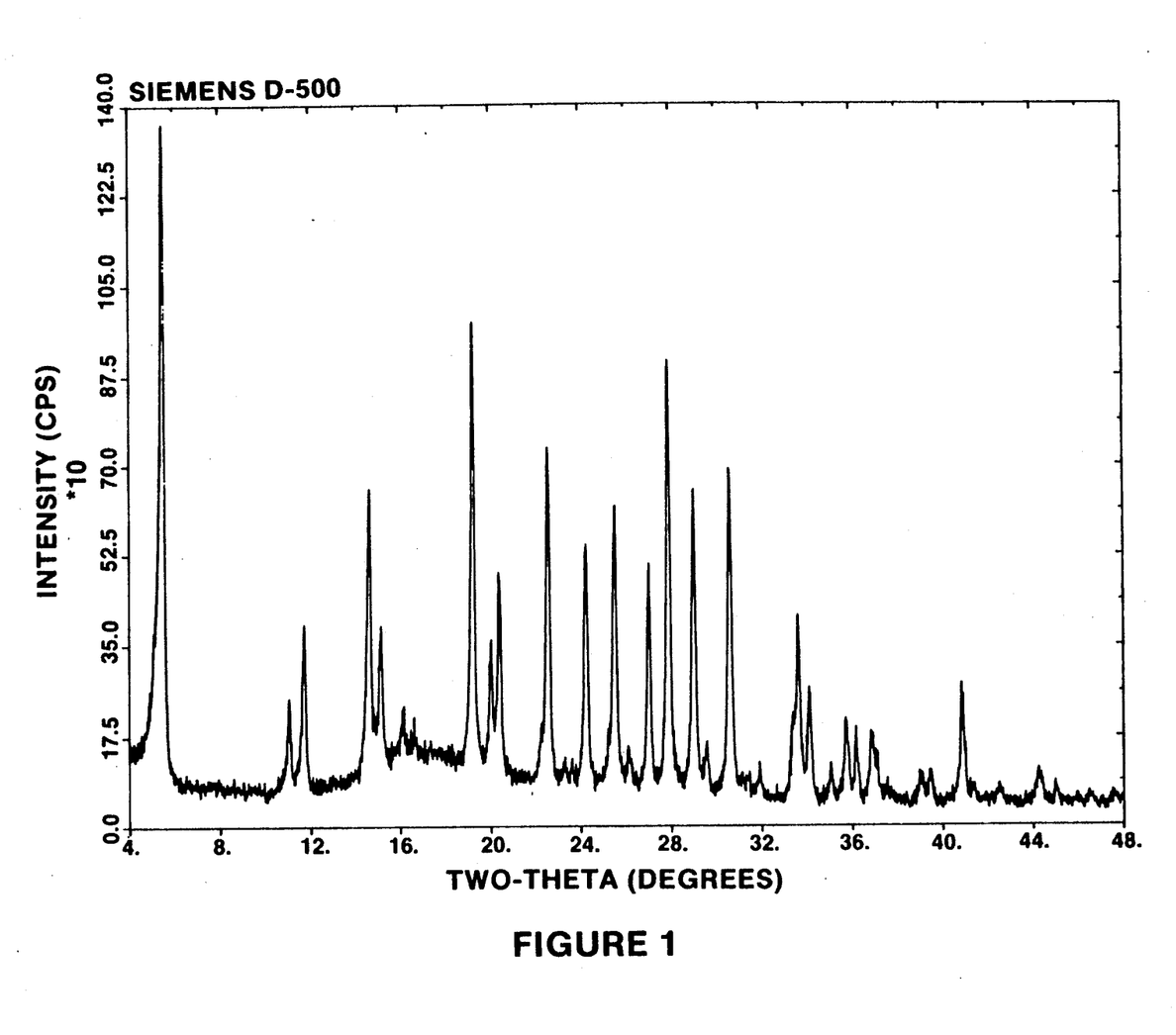
FIG. 1 in the drawing shows the X-ray powder diffraction pattern of a crystalline aluminosilicate with the zeolite L structure.

The X-ray powder diffraction data set forth in Tables 1 and 2 are characteristic of a molecular sieve having the zeolite L type structure. For comparison purposes, the X-ray powder diffraction pattern of a crystalline aluminosilicate with the zeolite L structure is shown in FIG. 1, and the corresponding X-ray powder diffraction data are set forth in Table 3.

TABLE 3

| Bragg Angle 2-Theta (Degrees) | Interplanar d-spacings (Angstroms) | Relative Intensity (100 × I/I$_o$) |
| --- | --- | --- |
| 5.514 | 16.0141 | 100.0 |
| 11.060 | 7.9928 | 13.4 |
| 11.731 | 7.5374 | 25.0 |
| 14.657 | 6.0383 | 40.0 |
| 15.174 | 5.8337 | 18.3 |
| 19.240 | 4.6091 | 68.1 |
| 20.042 | 4.4265 | 15.1 |
| 20.420 | 4.3455 | 26.2 |
| 22.598 | 3.9314 | 51.5 |
| 23.625 | 3.7627 | 4.0 |
| 24.270 | 3.6641 | 37.3 |
| 25.535 | 3.4854 | 42.3 |
| 26.134 | 3.4068 | 5.8 |
| 27.045 | 3.2941 | 34.0 |
| 27.916 | 3.1933 | 64.8 |
| 29.028 | 3.0735 | 44.9 |
| 29.574 | 3.0179 | 6.9 |
| 30.627 | 2.9165 | 49.2 |
| 31.907 | 2.8024 | 5.8 |
| 33.633 | 2.6624 | 25.3 |
| 34.114 | 2.6260 | 15.2 |
| 35.057 | 2.5575 | 6.2 |
| 35.753 | 2.5093 | 11.8 |
| 36.189 | 2.4800 | 10.9 |
| 36.889 | 2.4345 | 11.1 |
| 37.530 | 2.3944 | 3.6 |
| 39.056 | 2.3043 | 4.3 |
| 39.491 | 2.2799 | 4.9 |
| 40.901 | 2.2045 | 18.3 |
| 42.510 | 2.1247 | 3.5 |
| 44.256 | 2.0449 | 5.6 |
| 45.032 | 2.0114 | 3.0 |
| 47.474 | 1.9135 | 2.8 |

The X-ray powder diffraction data set forth in Tables 1 and 2 for the crystalline galliosilicate of the invention and in Table 3 for the crystalline aluminosilicate with the zeolite L structure are based on data obtained using a Siemens D-500 X-ray diffractometer with graphite-crystal monochromatized Cu-K alpha radiation. The peak heights I, and their position as a function of 2-theta, where theta is the Bragg angle, were read from the diffractometer output. From this output the relative intensities, 100×I/I$_o$, where I$_o$ is the intensity of the strongest peak, were read. The interplanar spacings, d, in Angstroms corresponding to the recorded peaks were then calculated in accordance with standard procedures. It will be understood that the peak heights and d-spacings associated with the X-ray powder diffraction pattern of the galliosilicate molecular sieve of the invention may vary somewhat depending on heat treatment, unit cell composition, crystal size, and whether the molecular sieve has been exchanged with hydrogen ions or metal cations.

After the synthesized galliosilicate crystals have been washed and dried, they are typically treated in order to render them active for acid catalyzed reactions. This procedure normally comprises calcining the washed and dried crystals in air at a temperature between about 400° C. and about 700° C., preferably between about 500° C. and about 600° C., for between about 5 hours and about 15 hours. After this calcination, the galliosilicate molecular sieve is again treated, normally by ion exchange with ammonium ions, hydrogen ions, polyvalent cations, such as lanthanum, cerium, or other rare earth-containing cations, or a combination of ammonium ions, hydrogen ions and polyvalent cations, to reduce its alkali metal content to below about 2.0 weight percent, preferably below about 0.5 weight percent and most preferably below about 0.05 weight percent, calculated as the alkali metal oxide. When reducing the alkali metal content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of alkali metal cations, the ion exchange procedure will be repeated at least twice, and occasionally several times. After the ammonium exchange or other treatment to reduce alkali metal content, the molecular sieve is again calcined in air under conditions similar to those used in the first calcination step. Calcination after an ammonium exchange serves to decompose the ammonium cations into ammonia, which is driven off during the calcination step, and thereby produce the catalytically active hydrogen form of the galliosilicate molecular sieve.

The crystalline, galliosilicate molecular sieve of the invention may be used as a catalyst for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, reforming, dewaxing, hydrodewaxing, oligomerization, aromatization, alcohol conversion reactions, the conversion of syngas to mixtures of hydrocarbons and the like. In utilizing the galliosilicates of the invention as a catalyst in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite and attapulgite, combinations of the above and the like. The preferred porous, inorganic refractory oxide component will depend upon the particular conversion process involved and will be well known to those skilled in the art. Examples of precursors that may be used include peptized alumina, alumina gel, hydrated alumina, silica-alumina, hydrogels, Ziegler-derived aluminas and silica sols. The exact amounts of crystalline galliosilicate and porous, inorganic refractory oxide used in the catalyst of the invention will again depend upon the particular conversion process in which the catalyst is to be used.

It will be understood that although the primary use of the catalyst of the invention will be in hydrocarbon conversion processes to convert hydrocarbon feedstocks into desirable reaction products, the catalyst can also be used to convert feedstocks or organic compounds other than hydrocarbons into desired reaction products. For example, the catalyst of the invention can be used to convert alcohols into transportation fuels and to convert gaseous mixtures of carbon monoxide and hydrogen into hydrocarbons. As used herein "hydrocarbon" refers to any compound which comprises hydrogen and carbon and "hydrocarbon feedstock" refers to any charge stock which contains a mixture of hydrocarbon compounds and comprises greater than about 70 weight percent carbon and hydrogen, preferably greater than about 80 weight percent, calculated as the elements.

Depending on the particular type of conversion process in which the catalyst of the invention is to be used, it may be desirable that the catalyst also contain a metal promoter or combination of metal promoters selected from Group IB, Group IIA, Group IIB, Group IIIA, Group IVA, Group VA, Group VIB, Group VIIB or Group VIII of the Periodic Table of elements. As used herein "Periodic Table of Elements" refers to the version found in the inside front cover of the "Handbook of Chemistry and Physics," 65th Edition, published in 1984 by the Chemical Rubber Company, Cleveland, Ohio. Specific metal components which may be used as promoters include components of copper, silver, zinc, aluminum, calcium, magnesium, barium, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. Depending on the properties of the metal chosen for use as the promoter, it may be ion exchanged into the crystalline galliosilicate itself, it may be incorporated into the mixture of the crystalline galliosilicate and the porous, inorganic refractory oxide, or it may be added by impregnation after the catalyst particles have been formed.

The catalyst of the invention is normally prepared by mulling the crystalline galliosilicate molecular sieve in powder form with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with the galliosilicate of the invention and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in the air at a temperature normally ranging between about 800° F. and about 1100° F. to produce the finished catalyst particles.

In addition to the crystalline, galliosilicate molecular sieve of the invention, the catalyst of the invention may also contain other molecular sieves such as aluminosilicates, borosilicates, aluminophosphates, silicoaluminophosphates, naturally occurring zeolites, pillared clays and delaminated clays. Suitable aluminosilicates for combining with the crystalline galliosilicate of the invention include Y zeolites, ultrastable Y zeolites, X zeolites, zeolite beta, zeolite L, faujasite and zeolite omega. The actual molecular sieve used in combination with the crystalline galliosilicate will depend upon the particular conversion process in which the catalyst of the invention is to be used. The molecular sieve of choice is normally incorporated into the catalyst by mixing the molecular sieve with the crystalline galliosilicate and porous, inorganic refractory oxide prior to mulling and extrusion.

It is typically preferred to use catalysts containing the crystalline galliosilicate molecular sieve of the invention in hydroconversion processes such as hydrocracking and isomerization. When used in such processes, the catalyst will normally contain hydrogenation components comprising metals selected from Group VIII and/or Group VIB of the Periodic Table of Elements. These hydrogenation metal components are incorporated into the catalyst either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component. It may be advantageous in some cases to add a Group IIA metal component such as barium to the crystalline galliosilicate molecular sieve to modify its acidity prior to forming the catalyst particles and adding the Group VIB and/or Group VIII metal component.

If the hydrogenation metal component consists essentially of a noble metal such as platinum or palladium, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using the catalyst of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

The nature and objects of the invention are further illustrated by the following examples, which are provided for illustrative purposes only and not to limit the invention as defined by claims. The examples demonstrate methods of synthesizing a crystalline galliosilicate with the zeolite L type structure.

EXAMPLE 1

An aqueous solution of potassium hydroxide is prepared by dissolving commercial grade potassium hydroxide crystals in distilled water. Gallium oxide is then added to the solution and the resultant mixture is vigorously stirred under boiling conditions until the gallium oxide is completely dissolved. After stirring, Ludox HS-40, a colloidal silica sol manufactured and sold by the DuPont Chemical Company, is added dropwise to the stirred mixture to form a hydrogel having the following composition expressed in terms of oxide mole ratios:

$Ga_2O_3:20.0\ SiO_2:8.0\ K_2O:250\ H_2O$

The resultant hydrogel is stirred at room temperature for 10 hours and then heated at about 125° C. in an autoclave for about 7 days. The galliosilicate crystals formed have the following composition expressed in terxs of oxide mole ratios in the anhydrous state:

$Ga_2O_3:6.25\ SiO_2:1.03\ K_2O$

An X-ray diffractogram of the crystals is obtained using a Siemens D-500 X-ray diffractometer with graphite-crystal monochromatized Cu-K alpha radiation. The resultant X-ray diffraction pattern is shown in FIG. 2 and the corresponding X-ray diffraction data including the calculated d-spacings are set forth in Table 4 below.

TABLE 4

| Bragg Angle 2-Theta (Degrees) | Interplanar d-spacings (Angstroms) | Relative Intensity (100 × $I/I_o$) |
|---|---|---|
| 5.446 | 16.2150 | 100.0 |
| 10.949 | 8.0737 | 6.7 |
| 11.654 | 7.5873 | 33.9 |
| 14.538 | 6.0877 | 36.7 |
| 15.069 | 5.8747 | 17.5 |
| 19.085 | 4.6464 | 63.1 |
| 19.885 | 4.4612 | 14.9 |
| 20.250 | 4.3816 | 8.7 |
| 22.438 | 3.9592 | 67.2 |
| 23.129 | 3.8424 | 7.2 |
| 24.134 | 3.6846 | 36.4 |
| 25.384 | 3.5058 | 52.2 |
| 25.980 | 3.4268 | 5.1 |
| 26.855 | 3.3171 | 27.2 |
| 27.717 | 3.2159 | 55.8 |
| 28.854 | 3.0917 | 48.1 |
| 30.454 | 2.9328 | 58.8 |
| 31.673 | 2.8226 | 7.6 |
| 33.400 | 2.6806 | 38.8 |
| 33.895 | 2.6425 | 18.0 |
| 34.834 | 2.5734 | 5.8 |
| 35.510 | 2.5259 | 17.4 |
| 35.960 | 2.4954 | 8.4 |
| 36.755 | 2.4432 | 12.4 |
| 37.961 | 2.3683 | 5.2 |
| 40.633 | 2.2185 | 13.8 |
| 31.148 | 2.1919 | 3.4 |

Figure 2:
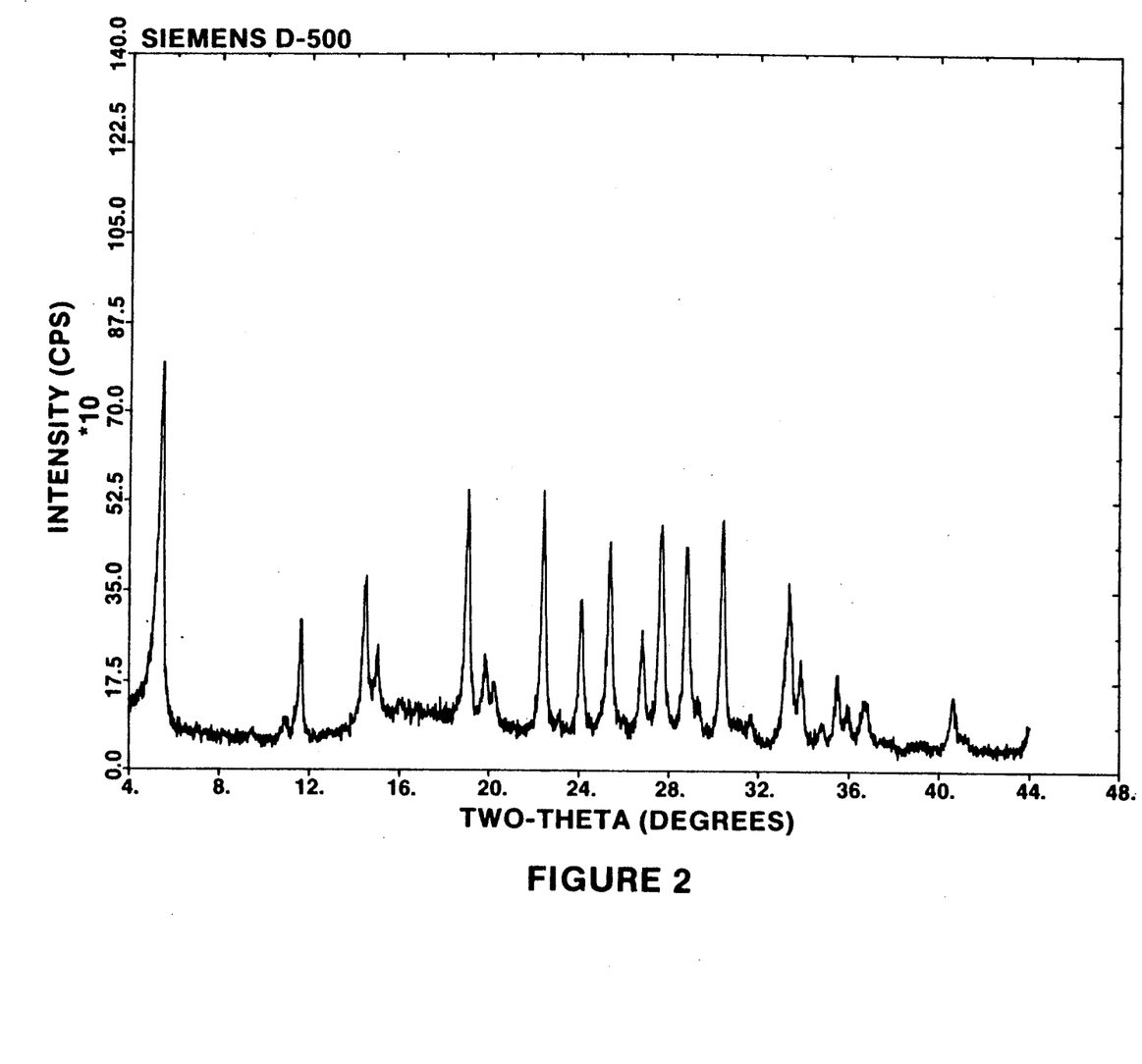
FIG. 2 depicts the X-ray powder diffraction pattern of the molecular sieve of the invention, i.e., a crystalline galliosilicate with the zeolite L type structure.

The X-ray powder diffraction pattern set forth in FIG. 2 is substantially similar to that set forth in FIG. 1 for a crystalline aluminosilicate or synthetic zeolite with the zeolite L structure. Thus, it is concluded that the crystalline galliosilicate synthesized in Example 1 has the zeolite L type structure. The d-spacing values for the synthesized galliosilicate set forth in Table 4 are higher than the corresponding values in Table 3 for the zeolite with the L type structure. These increases in d-spacing values are consistent with a larger unit cell size for the galliosilicate as shown in Table 5 below. This larger unit cell size is attributed to the isomorphous substitution of gallium, which has a larger ionic radius than aluminum, for aluminum in the zeolite L structure. Differences in the relative intensities set forth in Tables 3 and 4 result mainly from the different unit cell composition and crystal size of the two molecular sieves.

TABLE 5

| | Unit Cell Parameters | |
|---|---|---|
| Molecular Sieve | $a_o$ (Angstroms) | $c_o$ (Angstroms) |
| Synthetic Al-Zeolite L | 18.439 | 7.530 |
| Synthetic Ga-Sieve with Zeolite L Structure | 18.609 | 7.571 |

The crystals of the galliosilicate formed in the autoclave are subjected to calcination in flowing air at a temperature of 600° C. The resultant crystals have a BET surface area of about 320 m²/gram and retain about 100 percent of their original crystallinity.

EXAMPLE 2

An aqueous solution of potassium hydroxide and sodium hydroxide is prepared by dissolving commercial grade potassium hydroxide and sodium hydroxide crystals in distilled water. Gallium oxide is then added to the solution and the resultant mixture is vigorously stirred under boiling conditions until the gallium oxide is completely dissolved. After stirring, Ludox HS-40, a colloidal silica sol manufactured and sold by the DuPont Chemical Company, is added dropwise to the stirred mixture to form a hydrogel having the following composition expressed in terms of oxide mole ratios:

Ga$_2$O$_3$:28.0 SiO$_2$:4.0 Na$_2$O:6.0 K$_2$O:300 H$_2$O

The resultant hydrogel is stirred at room temperature for 10 hours and then heated at about 125° C. in an autoclave for about 7 days to form crystals. An X-ray diffractogram of the resultant crystals, which contain sodium in addition to potassium, is obtained as described in Example 1. The resultant X-ray diffraction pattern is essentially the same as that set forth in FIG. 2, which diffraction pattern was obtained using the crystals formed in Example 1. Thus, it is concluded that the crystals are that of a galliosilicate having the zeolite L structure.

It will be apparent from the foregoing that the invention provides a crystalline, galliosilicate molecular sieve having the zeolite L type structure and methods for preparing such a sieve. Catalysts containing such a molecular sieve are useful in a variety of chemical conversion processes, particularly hydrocarbon conversion processes such as isomerization and hydrocracking.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A catalyst composition comprising a porous, inorganic refractory oxide component and a catalytically active, galliosilicate molecular sieve which comprises silicon, gallium and oxygen, wherein said molecular sieve has an X-ray powder diffraction pattern characteristic of the zeolite L structure and contains less than about 0.20 weight percent alumina.

2. A catalyst composition as defined by claim 1, further comprising a molecular sieve selected from the group consisting of aluminosilicates, borosilicates, aluminophosphates, silicoaluminophosphates, pillared clays and delaminated clays.

3. A catalyst composition as defined by claim 1, further comprising a metal promoter component containing a metal selected from the group consisting of Group IB, Group IIB, Group IIIA, Group IVA, Group VA, Group VIB, Group VIIB and Group VIII of the Periodic Table of Elements.

4. A catalyst composition as defined by claim 3 wherein said metal promoter component comprises a metal selected from the group consisting of copper, silver, zinc, aluminum, calcium, magnesium, barium, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earth metals.

5. A catalyst composition as defined by claim 1 further comprising a hydrogenation metal component.

6. A catalyst composition as defined by claim 1 wherein said catalyst comprises at least one hydrogenation metal component selected from Group VIB metal components and at least one hydrogenation metal component selected from Group VIII metal components.

7. A catalyst composition as defined by claim 6 wherein said Group VIII metal component comprises a nickel component or a cobalt component and said Group VIB metal component comprises a tungsten component or a molybdenum component.

8. A catalyst composition as defined by claim 1 further comprising a barium component and a platinum component or a palladium component.

9. A catalyst composition comprising a porous, inorganic refractory oxide component and a catalytically active, galliosilicate molecular sieve which comprises silicon, gallium and oxygen, wherein said molecular sieve has an X-ray powder diffraction pattern comprising the d-spacing set forth in Table 1 and contains less than about 0.20 weight percent alumina.

10. A catalytically active, galliosilicate molecular sieve containing less than about 0.20 weight percent alumina prepared by ion-exchanging a synthesized galliosilicate molecular sieve whose composition is set forth below with cations selected from the group consisting of ammonium cations, lanthanum-containing cations and cerium-containing cations to reduce its alkali metal content, wherein said synthesized galliosilicate molecular sieve contains less than about 0.20 weight percent alumina and has the following composition expressed in terms of oxide mole ratios in the anhydrous state:

$$Ga_2O_3 : SiO_2 : yM_2O : zK_2O$$

where M is an alkali metal other than potassium, x equals at least 3.0, y equals 0 to 0.9, z equals 0.1 to 1.0 and y+z equals about 1.0, said synthesized galliosilicate molecular sieve having an X-ray powder diffraction pattern comprising the d-spacings set forth in Table 1.

11. A catalytically active, galliosilicate molecular sieve as defined by claim 10 wherein M is sodium.

12. A catalytically active, galliosilicate molecular sieve as defined by claim 11 wherein said synthesized galliosilicate molecular sieve is ion-exchanged with ammonium cations to reduce its sodium and potassium content to below about 0.05 weight percent, calculated as $Na_2O$ and $K_2O$, and the resultant ion-exchanged molecular sieve is then calcined.

13. A catalytically active, galliosilicate molecular sieve as defined by claim 11 wherein y equals 0.1 to 0.7.

14. A catalytically active, galliosilicate molecular sieve as defined by claim 10 wherein y equals 0 and x equals 4 to 10.

15. A catalytically active, galliosilicate molecular sieve as defined by claim 10 wherein said synthesized galliosilicate molecular sieve has an X-ray powder diffraction pattern characteristic of the zeolite L structure.

16. A catalytically active, galliosilicate molecular sieve as defined by claim 10 wherein said synthesized galliosilicate molecular sieve is substantially free of an organic templating agent.

17. A catalyst composition comprising a porous, inorganic refractory oxide component and the catalytically active, galliosilicate molecular sieve of claim 10.

18. A catalyst composition comprising a porous, inorganic refractory oxide component and the catalytically active, galliosilicate molecular sieve of claim 15.

19. A catalyst composition comprising a catalytically active, galliosilicate molecular sieve containing less than about 0.20 weight percent alumina prepared by the process comprising:

(a) mixing, in the absence of an added organic templating agent, a source of gallia, a source of silica, a source of potassium, water, and optionally, a source of an alkali metal other than potassium to form a hydrogel having the following oxide mole ratios of components:

$$SiO_2/Ga_2O_3 = 10 \text{ to } 35$$

$$(M_2O + K_2O)/Ga_2O_3 = 1 \text{ to } 15$$

$$H_2O/Ga_2O_3 = 80 \text{ to } 1000$$

$$M_2O/K_2O = 0 \text{ to } 100$$

where M is an alkali metal other than potassium;

(b) crystallizing said hydrogel to form crystals of said galliosilicate molecular sieve, said crystals having an X-ray powder diffraction pattern characteristic of the zeolite L structure;

(c) drying said crystals formed in step (b); and (d) ion-exchanging said crystals with ammonium cations, lanthanum-containing cations or cerium-containing cations to lower their alkali metal content.

20. A catalyst composition as defined by claim 19 wherein said hydrogel has the following oxide mole ratios of components:

$$SiO_2/Ga_2O_3 = 16 \text{ to } 30$$

$$(M_2O + K_2O)/Ga_2O_3 = 5 \text{ to } 10$$

$$H_2O/Ga_2O_3 = 100 \text{ to } 300$$

$$M_2O/K_2O = 0 \text{ to } 10.$$

21. A catalyst composition as defined by claim 19 wherein $SiO_2/Ga_2O_3 = 20 \text{ to } 35$.

* * * * *

UNITED STATES PATENT AND TRADEMARK OFFICE
CERTIFICATE OF CORRECTION

PATENT NO. : 5,035,868
DATED : July 30, 1991
INVENTOR(S) : Mario L. Occelli

It is certified that error appears in the above-indentified patent and that said Letters Patent is hereby corrected as shown below:

Title Page, item [57], line 5 under "ABSTRACT" change "$Ga_2O_3:xSiO_2yM_2O:zK_2O$" to "$Ga_2O_3:xSiO_2:yM_2O:zK_2O$".

Column 7, line 35, after "silica-alumina" and before "hydrogels" delete ",".

Signed and Sealed this

Twentieth Day of December, 1994

Attest:

BRUCE LEHMAN

*Attesting Officer*     *Commissioner of Patents and Trademarks*